(12) United States Patent
Ingram

(10) Patent No.: US 7,527,065 B2
(45) Date of Patent: May 5, 2009

(54) DOUBLE-WALLED FLEXIBLE DISPENSER SUMP CONNECTION SYSTEM

(75) Inventor: Thomas L. Ingram, Keller, TX (US)

(73) Assignee: Flex-Ing, Inc., Sherman, TX (US)

( * ) Notice: Subject to any disclaimer, the term of this patent is extended or adjusted under 35 U.S.C. 154(b) by 0 days.

(21) Appl. No.: 12/143,349

(22) Filed: Jun. 20, 2008

(65) Prior Publication Data

US 2008/0245417 A1 Oct. 9, 2008

Related U.S. Application Data

(63) Continuation of application No. 11/679,618, filed on Feb. 27, 2007, now abandoned, which is a continuation of application No. 11/061,388, filed on Feb. 18, 2005, now abandoned.

(51) Int. Cl.
*B65B 1/04* (2006.01)
*B65B 3/04* (2006.01)

(52) U.S. Cl. .................. 137/312; 141/59; 73/40.5 R

(58) Field of Classification Search .............. 137/68.14, 137/797, 312; 141/59, 285, 286; 285/420; 73/40.5 R, 49.1
See application file for complete search history.

(56) References Cited

U.S. PATENT DOCUMENTS

| | | | | |
|---|---|---|---|---|
| 1,969,203 A | 8/1934 | Cadden et al. | ........... | 285/222.2 |
| 2,172,532 A | 9/1939 | Fentress | | |
| 2,216,468 A | 10/1940 | Fanar | | |
| 2,357,669 A | 9/1944 | Lake | ........... | 285/222.5 |
| 2,363,586 A | 11/1944 | Guarnaschelli | ........... | 285/222.5 |
| 2,556,544 A | 6/1951 | Johnson | ........... | 285/222.5 |
| 2,583,956 A | 1/1952 | Lindsay et al. | ........... | 285/222.5 |
| 2,848,254 A | 8/1958 | Millar | | |
| 2,987,329 A | 6/1961 | Barton | ........... | 285/222.5 |
| 3,023,496 A | 3/1962 | Humphrey | ........... | 228/182 |
| 3,565,116 A | 2/1971 | Gabin | ........... | 138/109 |
| 4,141,576 A | 2/1979 | Lupke et al. | ........... | 285/369 |
| 4,232,712 A | 11/1980 | Squires | ........... | 138/109 |
| 4,578,855 A | 4/1986 | Van Der Hagen | ........... | 29/447 |
| 4,693,501 A | 9/1987 | Logsdon, Jr. et al. | ........... | 285/173 |
| 4,932,257 A * | 6/1990 | Webb | ........... | 73/40.5 R |
| 5,018,768 A * | 5/1991 | Palatchy | ........... | 285/24 |
| 5,060,509 A * | 10/1991 | Webb | ........... | 73/40.5 R |
| 5,069,253 A | 12/1991 | Hadley | ........... | 138/109 |
| 5,209,267 A | 5/1993 | Morin | ........... | 138/109 |
| 5,233,739 A | 8/1993 | Holden et al. | ........... | 29/237 |
| 5,335,945 A | 8/1994 | Meyers | ........... | 285/236 |
| 5,430,929 A | 7/1995 | Sanders | ........... | 29/507 |
| 5,511,720 A | 4/1996 | Zaborszki et al. | ........... | 228/136 |
| 5,529,098 A * | 6/1996 | Bravo | ........... | 141/88 |
| 5,769,463 A | 6/1998 | Thomas | ........... | 285/49 |
| 5,803,511 A | 9/1998 | Bessette | ........... | 285/222.5 |
| 5,894,865 A | 4/1999 | Winter et al. | ........... | 138/121 |
| 5,975,110 A * | 11/1999 | Sharp | ........... | 137/234.6 |

(Continued)

*Primary Examiner*—Stephen M Hepperle
*Assistant Examiner*—Cloud K Lee
(74) *Attorney, Agent, or Firm*—Michael A. O'Neil

(57) ABSTRACT

A double-walled flexible dispenser sump connection system prevents fuel leaks into a dispenser sump located below a fuel dispenser. An inner flexible connector and an outer flexible connector are configured such that the dispenser sump connection system may be installed on newly constructed fuel delivery systems or be retrofitted onto existing fuel delivery systems in order to bring them into compliance with recently environmental regulations.

6 Claims, 4 Drawing Sheets

U.S. PATENT DOCUMENTS

| | | | |
|---|---|---|---|
| 6,021,818 A | 2/2000 | Horst et al. | 138/172 |
| 6,032,699 A * | 3/2000 | Cochran et al. | 138/104 |
| 6,056,332 A * | 5/2000 | Foster | 285/367 |
| 6,092,274 A | 7/2000 | Foti | 29/520 |
| 6,116,817 A * | 9/2000 | Osborne | 405/154.1 |
| 6,182,679 B1 * | 2/2001 | Pendleton | 137/68.14 |
| 6,186,163 B1 * | 2/2001 | Borg | 137/312 |
| 6,216,736 B1 * | 4/2001 | Benedetti | 137/625.47 |
| 6,230,735 B1 * | 5/2001 | Bravo | 137/312 |
| 6,318,418 B1 * | 11/2001 | Grossmann et al. | 141/59 |
| 6,378,914 B1 | 4/2002 | Quaranta | 285/256 |
| 6,382,266 B1 * | 5/2002 | Bus | 141/59 |
| 6,446,661 B2 * | 9/2002 | Armenia et al. | 137/312 |
| 6,546,951 B1 * | 4/2003 | Armenia et al. | 137/312 |
| 6,672,327 B1 * | 1/2004 | Krywitsky | 137/68.14 |
| 6,823,886 B2 * | 11/2004 | Bravo et al. | 137/312 |
| 6,866,302 B2 | 3/2005 | Furata | 285/256 |
| 6,922,893 B2 | 8/2005 | Ingram | 29/890.144 |
| 6,974,054 B2 * | 12/2005 | Hutchinson | 222/109 |
| 7,014,216 B2 | 3/2006 | Mittersteiner et al. | 285/247 |
| 7,017,949 B2 | 3/2006 | Luft et al. | 285/256 |
| 7,063,358 B2 | 6/2006 | Ingram | |
| 7,140,648 B2 | 11/2006 | Ingram | |
| 2003/0197372 A1 | 10/2003 | Hoff et al. | 285/256 |
| 2004/0035464 A1 * | 2/2004 | Folkers | 137/312 |
| 2006/0049628 A1 | 3/2006 | Ingram | 285/256 |

* cited by examiner

DOUBLE-WALLED FLEXIBLE DISPENSER SUMP CONNECTION SYSTEM

CROSS-REFERENCE TO RELATED APPLICATION

This application is a continuation application of U.S. patent application Ser. No. 11/679,618 filed Feb. 27, 2007, now abandoned which is a continuation patent application of U.S. patent application Ser. No. 11/061,388 filed Feb. 18, 2005, now abandoned, the entire contents of which are incorporated herein by reference.

TECHNICAL FIELD

This invention relates generally to fuel dispenser sumps used in gas stations and in similar applications, and more particularly to a double-walled flexible dispenser sump connection system that provides a safeguard against leaks from dispenser sumps located beneath the gasoline dispensers.

BACKGROUND AND SUMMARY OF THE INVENTION

State environmental and energy agencies require strict compliance with laws and regulations regarding fuel storage and conveyance, in particular regarding containment of fuel within the pipes and other components beneath the ground surface at gas stations. Piping systems for conveying the fuel between the underground tanks and dispensers must be pressurized and vacuum sealed to detect and contain leaks therein.

Referring to FIG. 1, there is shown a common dispenser sump connection system 10 below a fuel dispenser 12 at a gas station. Fuel is conveyed from a tank 14 through a primary inner pipe 16, traditionally two inches in diameter, into a dispenser sump 18 below the fuel dispenser 12. Once inside the dispenser sump 18 the inner pipe 16 continues through an elbow joint 20 to a connecting inner pipe 22, which couples to a shear valve 24 located at the bottom of the fuel dispenser 12. The shear valve 24 prevents fuel spills or leaks in the event that the fuel dispenser 12 is displaced from the dispenser sump 18.

A secondary outer pipe 26, traditionally three inches in diameter, encloses the inner pipe 16 from the tank 14 to the dispenser sump 18. The outer pipe 26 prevents fuel from entering into and contaminating the groundsoil and/or the atmosphere. The interstitial space between the outer pipe 26 and the inner pipe 16 is either pressurized or vacuum sealed to provide additional protection against leaks.

Although the outer pipe 26 contains any leaks between the tank 14 and the dispenser sump 18, the outer pipe 26 terminates into a boot at the dispenser sump 18, leaving the inner pipe 16 is exposed inside the dispenser sump 18. Therefore, there are no safeguards to detect or contain leaks that occur inside the dispenser sump 18, which can result in leaks into the groundsoil surrounding the dispenser sump 18 and/or into the atmosphere. Recently, regulations have been passed in several states such as California which require safeguards be installed to prevent leaks from dispenser sumps. Currently the approved safeguards require retrofitting the existing dispenser sump with the equivalent of an outer sump around the dispenser sump within the space between the outer and inner sump being either pressurized or vacuum sealed, or replacing the existing dispenser sump with a double-walled pressurized sump. The cost to install the outer sump or replace the existing sump costs approximately $2,000 minimum per dispenser. Considering that most gas stations have multiple dispensers, the cost to retrofit the existing sumps to bring them into compliance can be substantial.

The present invention comprises a dispenser sump connection system which overcomes the foregoing and other difficulties which have long since characterized the prior art. In accordance with the broader aspects of the invention, an outer and inner flexible connector system provides protection against fuel leakage from the dispenser sump. The inner flexible connector connects the primary inner pipe to the shear valve. The outer flexible connector completely encloses the inner flexible connector from the sump wall to the shear valve. The interstitial space between the outer flexible connector and the inner flexible connector is pressurized and/or be vacuum sealed thereby preventing any fuel leakage into the dispenser sump.

The outer and inner flexible connector system can be retrofitted inside existing dispenser sumps at a minimal cost per dispenser. The present invention provides the high level of protection against leakage required by state environmental agencies and eliminates the need for installing an outer sump or retrofitting with a double-walled sump.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
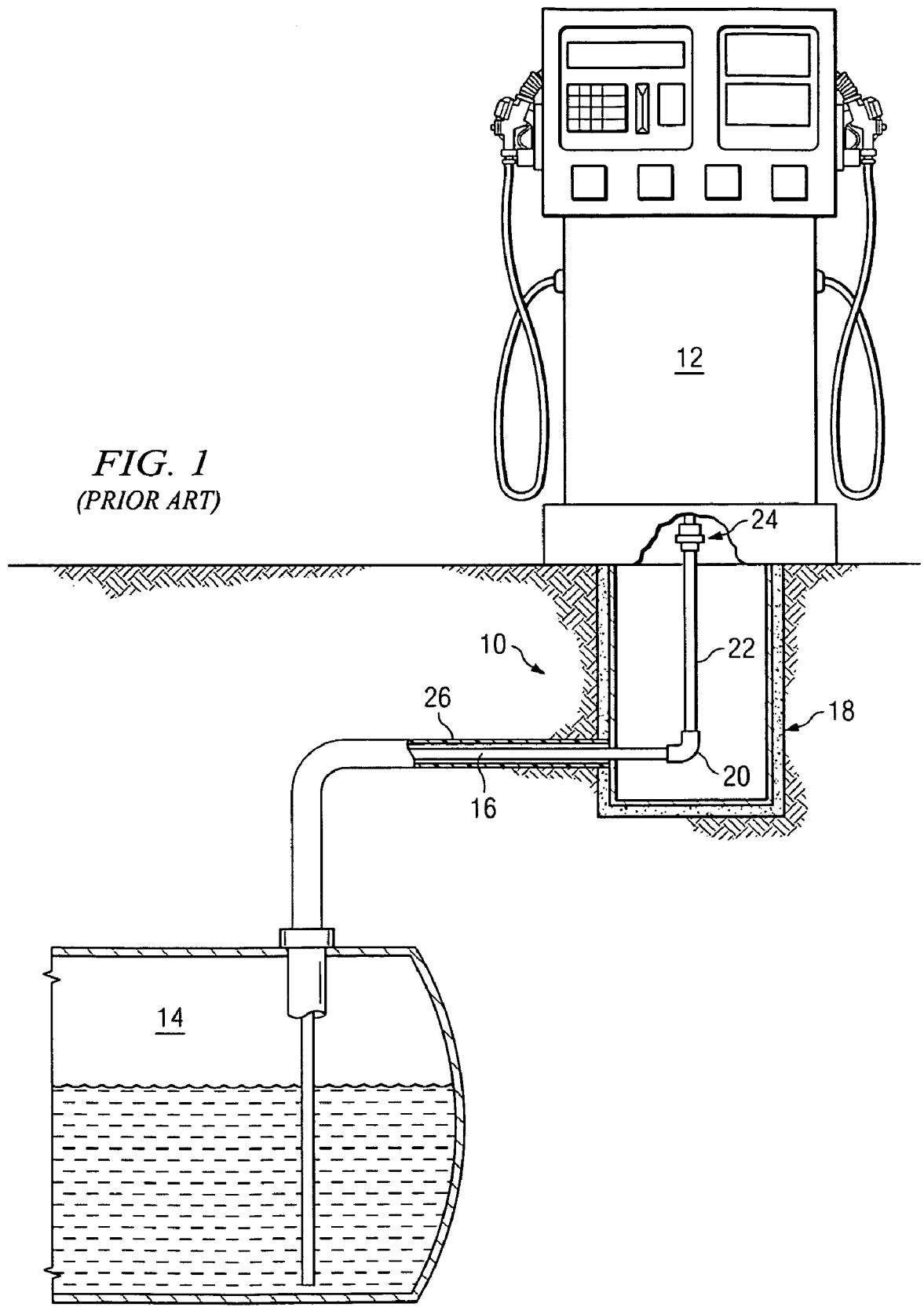
FIG. 1 is a sectional view illustrating a prior art fuel delivery and dispenser sump connection system.
Figure 2:
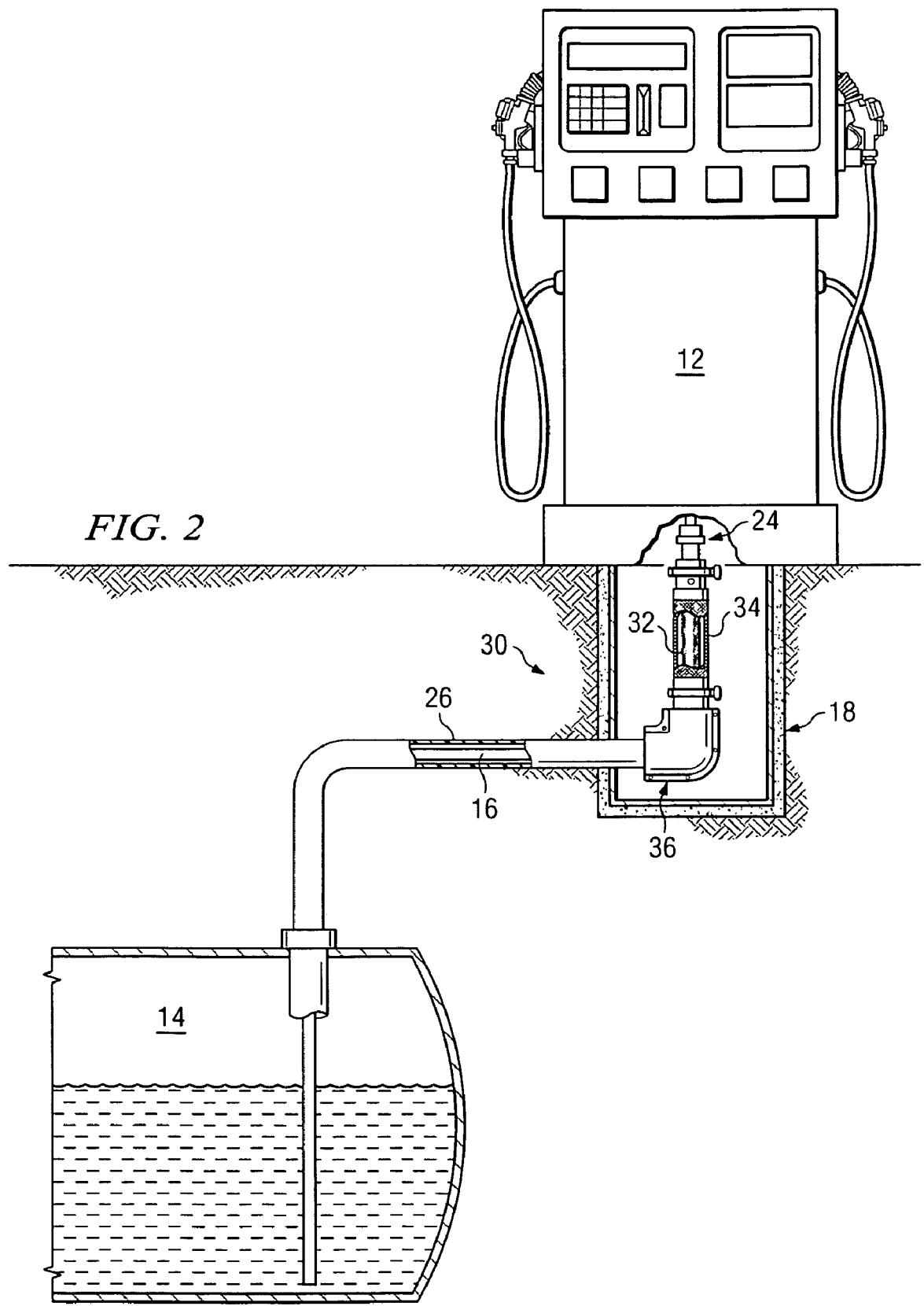
FIG. 2 is a sectional view of the double-walled flexible dispenser sump connection system of the present invention.
Figure 3:
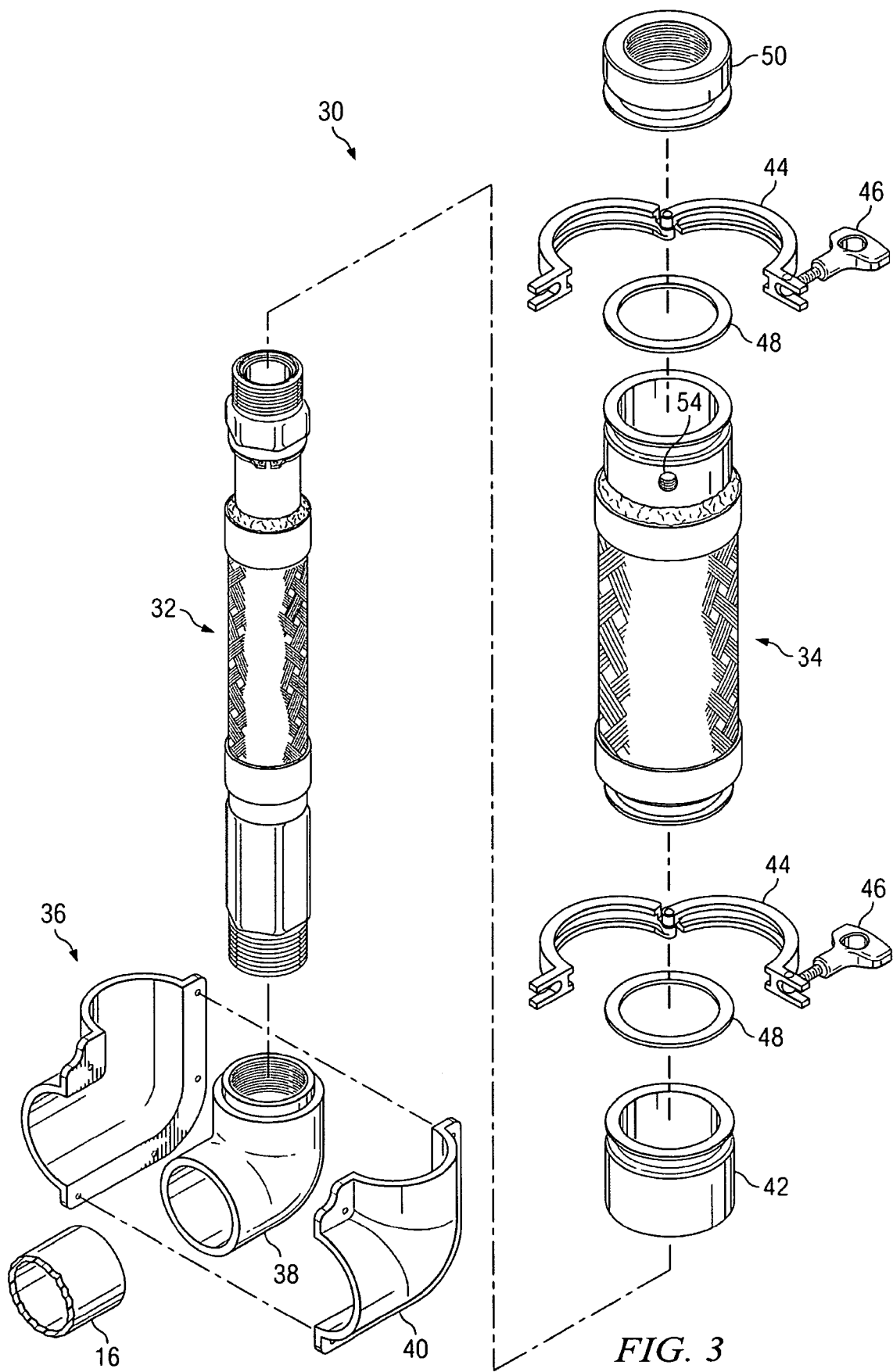
FIG. 3 is an exploded perspective view of the dispenser sump connection system shown in FIG. 2.
Figure 4:
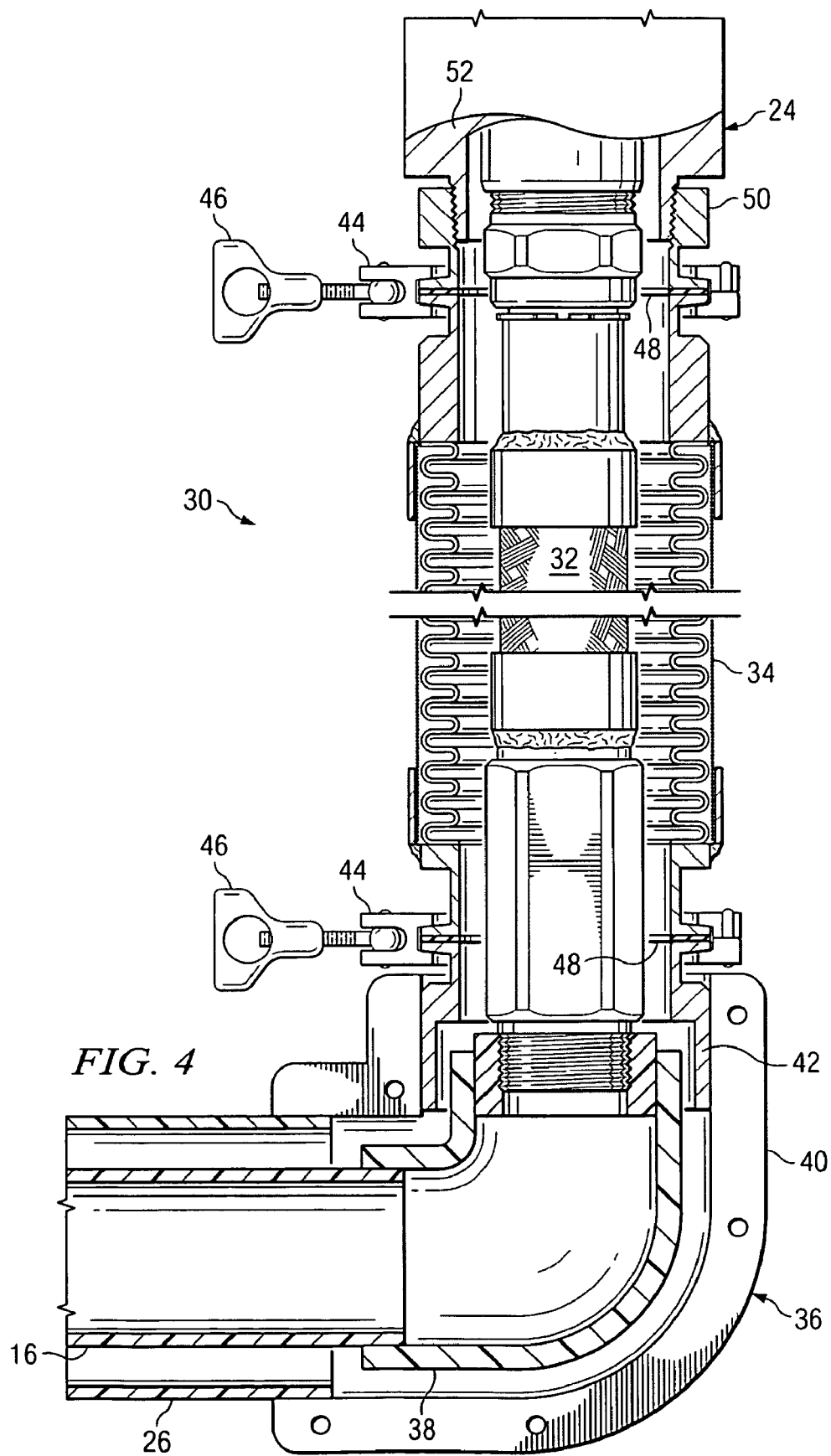
FIG. 4 is a sectional view of the dispenser sump connection system shown in FIG. 2.

Referring now to the Drawings, and particularly to FIGS. 2, 3, and 4 thereof, there is shown the dispenser sump connection system 30 of the present invention. An inner flexible connector 32 is connected to the inner pipe 16 for completing the conveyance of fuel to the fuel dispenser 12. An outer flexible connector 34 is installed over and completely encloses the inner flexible connector 32. The lower end of the outer flexible connector 34 is connected in fluid communication with the outer pipe 26. The upper end of the outer flexible connector 34 is connected to the shear valve 24 thereby completing the containment of any leaks from either the inner pipe 16 and the inner flexible connector 32. The interstitial space between the outer flexible connector 34 and the inner flexible connector 32 is either pressurized or vacuum sealed thereby preventing any fuel leakage into the dispenser sump 18. The flexible connectors 32 and 34 used in conjunction with the present invention are described in detail in U.S. Pat. Nos. 7,140,648; 6,922,893; and 7,063,358.

In the embodiment shown in FIGS. 2 through 4, the inner flexible connector 32 couples to the inner pipe 16 through an elbow joint 36 comprising an inner elbow joint 38 secured to the distal end of the inner pipe 16 and an outer containment clamshell 40, which glues over the inner elbow joint 38 to contain any leaks that may occur therefrom. The dispenser sump connection system 30 of the present invention may also be secured directly to the inner and outer pipes 16 and 26, or by other connection means known to those skilled in the art and suitable for use in fuel and hazardous material delivery systems.

FIG. 3 is an exploded view and FIG. 4 is a sectional view of the dispenser sump connection system 30. The inner flexible connector 32 threadedly secures into the inner elbow joint 38, thereby completing the connection of the inner flexible connector 32 to the inner pipe 16. The top of the inner flexible connector 32 has male threads for threadedly securing the inner flexible connector 32 into the shear valve 24. The outer flexible connector 34 installs over the inner flexible connector 32 and is connected to the elbow joint 36 by a lower connection ring 42, which extends around the end of the inner elbow joint 38. The outer containment clamshell 40 when glued over the inner elbow joint 38 covers and thereby contains the connection of the lower connection ring 42 to the inner elbow joint 38.

The lower end of the outer flexible connector 34 is secured to the lower connection ring 42 by a first hinged circular clamp 44 having a threaded locking mechanism 46. A gasket 48 is mounted between the outer flexible connector 34 and lower connection ring 42. Wedge shaped surfaces on the outer flexible connector 34 and on the lower connection ring 42 and corresponding shapes on the inner surfaces of the hinged circular clamp 44, combined with the gasket 48, cause the outer flexible connector 34 and the lower connection ring 42 to form a compression seal as the threaded locking mechanism 46 is tightened.

The upper end of the outer flexible connector 34 is connected to the shear valve 24 by an upper connection ring 50. The outer flexible connector 34 is secured to the upper connection ring 50 by a second hinged circular clamp 44 having a threaded locking mechanism 46. A gasket 48 is positioned between the outer flexible connector 34 and upper connection ring 50. Wedge shaped surfaces on the outer flexible connector 34 and on the upper connection ring 50 and corresponding shapes on the inner surfaces of the hinged circular clamp 44, combined with the gasket 48, cause the outer flexible connector 34 and the upper connection ring 50 to form a compression seal as the threaded locking mechanism 46 is tightened. The upper connection ring 50 comprises female threads for threadedly securing an outer housing 52 of the shear valve 24 thereinto.

Near the upper end of the outer flexible connector 34 is an orifice 54 which facilitates either vacuum sealing or pressurization of the interstitial space between the inner flexible connector 32 and the outer flexible connector 34. The lower connection ring 42, the upper connection ring 50, and the hinged circular clamps 44 may be formed from stainless steel, bronze, brass, monel, other metals, various polymeric materials, and other materials that will not be adversely affected by the fluid that will flow through the inner and outer flexible connectors 32 and 34. The inner elbow joint 38 and the outer containment clamshell 40 are commercially available parts used in conjunction with fuel delivery systems and other hazardous material delivery systems.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. A fuel supply system comprising:
   a dispenser pump having a shear valve at the bottom thereof for directing fuel into the dispenser pump;
   a dispenser sump located directly below the dispenser pump;
   a fuel tank;
   a piping system for conveying fuel from the fuel tank into the dispenser sump;
   the piping system comprising an inner pipe for conveying fuel and an outer pipe surrounding the inner pipe for containment of leaks therefrom;
   an inner flexible connector extending through the dispenser sump and coupled between the end of the inner pipe and the shear valve for completing the conveyance of fuel into the dispenser pump;
   an outer flexible connector coupled to the end of the outer pipe and the shear valve, wherein the flexible connector is coupled between the end of the outer pipe and the shear valve; and
   means for continuously maintaining a predetermined pressure selected from the group consisting of a predetermined positive pressure and a vacuum seal within the interstitial space between the inner flexible connector and the outer flexible connector.

2. The dispenser sump connection system of claim 1 wherein pressure maintaining means includes an orifice located at the upper end of the outer flexible connector.

3. The dispenser sump connection system of claim 2 wherein the inner flexible connector is threadedly secured to an inner elbow joint fastened to the distal end of the inner pipe and an outer containment clamshell which is secured around the inner elbow joint.

4. The dispenser sump connection system of claim 3 wherein the inner flexible connector is threadedly secured to the shear valve.

5. The dispenser sump connection system of claim 4 further comprising:
   a first connection ring for coupling the outer flexible connector over the distal end of the inner pipe;
   a gasket seated between the first connection ring and the outer flexible connector for facilitating a pressure seal; and
   a clamping ring having a threaded locking device for securing and compressing the outer flexible connector and the first connection ring together.

6. The dispenser sump connection system of claim 5 further comprising:
   a second connection ring for coupling the outer flexible connector to an outer housing of the shear valve;
   a gasket seated between the second connection ring and the outer flexible connector for facilitating a pressure seal; and
   a clamping ring having a threaded locking device for securing and compressing the outer flexible connector and the outer housing of the shear valve together.

* * * * *